(12) United States Patent
Wilson et al.

(10) Patent No.: US 7,921,204 B2
(45) Date of Patent: *Apr. 5, 2011

(54) MESSAGE TESTING BASED ON A DETERMINATE MESSAGE CLASSIFICATION AND MINIMIZED RESOURCE CONSUMPTION

(75) Inventors: Brian K. Wilson, Palo Alto, CA (US); David A. Koblas, Los Altos, CA (US); Scott D. Eikenberry, Menlo Park, CA (US); Paul R. Wieneke, Los Altos, CA (US); Damon K. Uyeda, San Francisco, CA (US); Tim Nufire, San Francisco, CA (US); Jonathan J. Oliver, San Carlos, CA (US)

(73) Assignee: SonicWALL, Inc., San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/927,516

(22) Filed: Oct. 29, 2007

(65) Prior Publication Data

US 2008/0104187 A1 May 1, 2008

Related U.S. Application Data

(63) Continuation of application No. 10/422,359, filed on Apr. 23, 2003, now Pat. No. 7,539,726, which is a continuation-in-part of application No. 10/197,393, filed on Jul. 16, 2002.

(51) Int. Cl.
*G06F 15/16* (2006.01)

(52) U.S. Cl. ............. 709/224; 709/206; 726/11; 726/22

(58) Field of Classification Search .......... 709/206–207, 709/224, 202; 726/11–14, 22–33
See application file for complete search history.

(56) References Cited

U.S. PATENT DOCUMENTS

| | | |
|---|---|---|
| 5,999,929 A | 12/1999 | Goodman |
| 6,023,723 A | 2/2000 | McCormick et al. |
| 6,026,491 A | 2/2000 | Hiles |
| 6,052,709 A | 4/2000 | Paul |
| 6,055,508 A | 4/2000 | Naor et al. |
| 6,072,942 A | 6/2000 | Stockwell et al. |
| 6,076,101 A | 6/2000 | Kamakura et al. |
| 6,112,227 A | 8/2000 | Heiner |
| 6,199,102 B1 | 3/2001 | Cobb |
| 6,234,802 B1 | 5/2001 | Pella et al. |
| 6,266,692 B1 | 7/2001 | Greenstein |
| 6,393,465 B2 | 5/2002 | Leeds |
| 6,421,709 B1 | 7/2002 | McCormick et al. |
| 6,424,997 B1 | 7/2002 | Buskirk et al. |
| 6,438,690 B1 | 8/2002 | Patel et al. |

(Continued)

OTHER PUBLICATIONS

Anon., "The Lifecycle of Spam," PC Magazine, Feb. 25, 2003, pp. 74-97.

(Continued)

*Primary Examiner* — David Lazaro
(74) *Attorney, Agent, or Firm* — Carr & Ferrell LLP

(57) ABSTRACT

A system and method are disclosed for routing a message through a plurality of test methods. The method includes: receiving a message; applying a first test method to the message; updating a state of the message based on the first test method; and determining a second test method to be applied to the message based on the state.

13 Claims, 8 Drawing Sheets

| Test Method | Possible Results | Maximum Results | Resource Consumption |
|---|---|---|---|
| Whitelist | No judgement<br>Non-spam | Non-spam | 1 |
| Blacklist | No judgement<br>Spam | Spam | 1.5 |
| Keyword rule | No judgement<br>Probably spam<br>Spam | Spam | 1.7 |
| Thumbprint | No judgement<br>Spam<br>Probably not spam | Spam | 2 |
| Statistical Classifier | No judgement<br>Probably spam<br>Probably not spam<br>Spam | Spam | 3 |
| Challenge Response | Spam<br>Non-spam | Non-spam | 4 |

U.S. PATENT DOCUMENTS

| | | |
|---|---|---|
| 6,453,327 B1 | 9/2002 | Nielsen |
| 6,460,073 B1 | 10/2002 | Asakura |
| 6,539,092 B1 | 3/2003 | Kocher |
| 6,546,416 B1 | 4/2003 | Kirsch |
| 6,563,912 B1 | 5/2003 | Dorfman et al. |
| 6,615,242 B1 | 9/2003 | Riemers |
| 6,640,301 B1 | 10/2003 | Ng |
| 6,643,686 B1 | 11/2003 | Hall |
| 6,650,890 B1 | 11/2003 | Irlam et al. |
| 6,654,787 B1 * | 11/2003 | Aronson et al. ............... 709/206 |
| 6,691,156 B1 | 2/2004 | Drummond et al. |
| 6,708,205 B2 | 3/2004 | Sheldon et al. |
| 6,728,378 B2 | 4/2004 | Garib |
| 6,732,149 B1 | 5/2004 | Kephart |
| 6,760,752 B1 | 7/2004 | Liu |
| 6,772,196 B1 | 8/2004 | Kirsch et al. |
| 6,778,941 B1 | 8/2004 | Worrell et al. |
| 6,779,021 B1 | 8/2004 | Bates et al. |
| 6,829,635 B1 | 12/2004 | Townshend |
| 6,836,750 B2 | 12/2004 | Wong et al. |
| 6,842,773 B1 | 1/2005 | Ralston et al. |
| 6,851,051 B1 | 2/2005 | Bolle et al. |
| 6,868,498 B1 | 3/2005 | Katsikas |
| 6,876,977 B1 | 4/2005 | Marks |
| 6,931,433 B1 | 8/2005 | Ralston et al. |
| 6,941,348 B2 | 9/2005 | Petry et al. |
| 6,963,928 B1 | 11/2005 | Bagley et al. |
| 6,965,919 B1 | 11/2005 | Woods et al. |
| 7,003,724 B2 | 2/2006 | Newman |
| 7,006,993 B1 | 2/2006 | Cheong et al. |
| 7,016,875 B1 | 3/2006 | Steele et al. |
| 7,016,877 B1 | 3/2006 | Steele et al. |
| 7,039,949 B2 | 5/2006 | Cartmell |
| 7,072,943 B2 | 7/2006 | Landesmann |
| 7,076,241 B1 | 7/2006 | Zondervan |
| 7,127,405 B1 | 10/2006 | Frank et al. |
| 7,149,778 B1 | 12/2006 | Patel et al. |
| 7,171,450 B2 * | 1/2007 | Wallace et al. ............... 709/206 |
| 7,178,099 B2 | 2/2007 | Meyer et al. |
| 7,206,814 B2 | 4/2007 | Kirsch |
| 7,231,428 B2 | 6/2007 | Teague |
| 7,249,175 B1 | 7/2007 | Donaldson |
| 7,293,063 B1 | 11/2007 | Sobel |
| 7,299,261 B1 | 11/2007 | Oliver et al. |
| 7,441,277 B2 | 10/2008 | Burges |
| 2001/0044803 A1 | 11/2001 | Szutu |
| 2001/0047391 A1 | 11/2001 | Szutu |
| 2002/0046275 A1 | 4/2002 | Crosbie et al. |
| 2002/0087573 A1 | 7/2002 | Reuning et al. |
| 2002/0116463 A1 | 8/2002 | Hart |
| 2002/0162025 A1 | 10/2002 | Sutton et al. |
| 2002/0188689 A1 | 12/2002 | Michael |
| 2002/0199095 A1 | 12/2002 | Bandini et al. |
| 2003/0009526 A1 | 1/2003 | Bellegarda et al. |
| 2003/0023692 A1 | 1/2003 | Moroo |
| 2003/0023736 A1 | 1/2003 | Abkemeier |
| 2003/0041126 A1 | 2/2003 | Buford et al. |
| 2003/0041280 A1 | 2/2003 | Malcolm et al. |
| 2003/0046421 A1 | 3/2003 | Horvitz et al. |
| 2003/0069933 A1 | 4/2003 | Lim et al. |
| 2003/0105827 A1 | 6/2003 | Tan et al. |
| 2003/0149726 A1 | 8/2003 | Spear |
| 2003/0158903 A1 | 8/2003 | Rohall et al. |
| 2003/0163357 A1 | 8/2003 | Engleman et al. |
| 2003/0167311 A1 | 9/2003 | Kirsch |
| 2003/0195764 A1 | 10/2003 | Baker et al. |
| 2003/0195937 A1 | 10/2003 | Kircher et al. |
| 2003/0204569 A1 | 10/2003 | Andrews et al. |
| 2003/0229672 A1 | 12/2003 | Kohn |
| 2003/0233418 A1 | 12/2003 | Goldman |
| 2004/0003283 A1 * | 1/2004 | Goodman et al. ............ 713/201 |
| 2004/0015554 A1 | 1/2004 | Wilson |
| 2004/0024639 A1 | 2/2004 | Goldman |
| 2004/0030776 A1 | 2/2004 | Cantrell et al. |
| 2004/0059786 A1 | 3/2004 | Caughey |
| 2004/0083270 A1 | 4/2004 | Heckerman et al. |
| 2004/0103160 A1 | 5/2004 | Sheldon et al. |
| 2004/0117451 A1 | 6/2004 | Chung |
| 2004/0158554 A1 | 8/2004 | Trottman |
| 2004/0167964 A1 | 8/2004 | Rounthwaite et al. |
| 2004/0177120 A1 | 9/2004 | Kirsch |
| 2005/0055410 A1 | 3/2005 | Landsman et al. |
| 2005/0081059 A1 | 4/2005 | Bandini et al. |
| 2005/0114705 A1 | 5/2005 | Reshef et al. |
| 2005/0125667 A1 | 6/2005 | Sullivan et al. |
| 2005/0172213 A1 | 8/2005 | Ralston et al. |
| 2006/0010217 A1 | 1/2006 | Sood |
| 2006/0031346 A1 | 2/2006 | Zheng et al. |
| 2006/0036693 A1 | 2/2006 | Hulten et al. |
| 2006/0095528 A1 | 5/2006 | Sykes, Jr. |
| 2006/0282888 A1 | 12/2006 | Bandini et al. |
| 2008/0271116 A1 | 10/2008 | Robinson et al. |

OTHER PUBLICATIONS

Bryan,Georgantopoulous, "MScin Speech and Language Processing Dissertation: Automatic summarizing based on sentence extraction: A statistical approach," Department of Linguistics, University of Edinburgh, http://cgi.di.uoa.gr/~bryon/msc.html.

D.H. Lie, "Sumatra: A system for Automatic Summary Generation," http://www.carptechnologies.nl/SumatraTWLT14paper/SumatraTWLT14.html.

Anon., "Correspondence Negotiation Protocol," http://ww.cs.sfu.ca/~cameron/CNP.html.

Anon., "Cloudmark, Different Approaches to Spamfighting," Whitepaper, Version 1.0, Nov. 2002.

Anon., "DigiPortal Software, Creating Order from Chaos," Support, Frequently Asked Questions, http://ww/digiportal.com/support/choicemail/faq.html.

Paul Hoffman et al., "Unsolicited Bulk Email: Mechanisms for Control," Internet Mail Consortium Report: UBE-SOL, IMCR-008, revised May 4, 1998.

Satheesh Kolathur et al., "Spam Filter, A collaborative Method of Eliminating Spam," Whitepaper, published Dec. 8, 2000, http://www.cs.uh.edu/~kolathur/Paper.htm.

Anon., "Challenge Messages," Mailblocks, http://suportmailblocks.com/tab_howto/Validation/detail_privacy_challenge.asp.

Anon., "How Challenge/Response Works," http://about.mailblocks.com/challenge.html.

Razor-agents 2.22, http://razor.sourceforge.net.

Anon., "Project: Vipul's Razor: Summary," http://sourceforge.net/projects/razor/.

Spamarrest, The Product, How it Works, http://spamarrest.com/products/howitworks.jsp.

SpamAssassin, "Welcome to SpamAssassin," http://spamassassin.org.

"Hash Function," http://en.wikipedia.org/wiki/Hash_value, last accessed Nov. 15, 2006.

"Giant Company Software Announces Full Integrated AOL Support for it Popular Spam Inspector Anti-Spam Software," GIANT Compnay Software, Inc., 2002.

Jason Mastaler, "Tagged Message Delivery Agent (TMDA)," TDMA Hompage, 2003.

"Digital Signature," http://www.cnet.com/Reources/Info/Glossary/Terms/digitalsignature.html, last accessed Nov. 15, 2006.

"Active SMTP White Paper," ESCOM Corp. 2000-2006.

Anon., "Tagged Message Delivery Agent (TMDA)," http://tmda.net/index.html.

Dwork, Cynthia, et al. "Pricing via Processing or Combating Junk Mail," CRYPTO '92, Springer-Verlag LNCS 740, pp. 139-147, 1992.

Von Ahn, Luis, et al., "Telling Humans and COmputers Apart (Automatically) or How Lazy Cryptographers do AI," Communications to the ACM, Feb. 2004.

Skoll, David F., "How to Make Sure a Human is Sending You Mail," Google Groups Thread (Nov. 17, 1996).

Byrne, Julian, "My Spamblock," Google Groups Thread (Jan. 19, 1997).

Guilmette, Ronald F., "To Mung or Not to Mung," Google Groups Thread (Jul. 24, 1997).

Temleton, Brad, "Viking-12 Junk E-Mail Blocker," (believed to have last been updated Jul. 15, 2003).

"Majordomo FAQ," Oct. 20, 2001.

Langberg, Mike, "Spam Foe Needs Filter of Himself," (Email Thread Dated Apr. 5, 2003).

McCullagh, Declan, "In-Boxes that Fight Back," News.com, May 19, 2003.

Anon., "Giant Company Software announces full integrated AOL support for it popular Spam Inspector anti-spam software," http://giantcompany.com/pressReleases.aspx.

Cranor, Lorrie, et al., "Spam!," Communications of the ACM, vol. 41, Issue 8, pp. 74-83, Aug. 1998.

Jung, Jaeyeon, et al., "An Empirical Study of Spam Traffic and the Use of DNS Black Lists," IMC'04, Taormina, Sicily, Italy, Oct. 25-27, 2004.

Weinstein, Lauren, "Spam Wars," Communications of the ACM, vol. 46, Issue 8, p. 136, Aug. 2003.

Gomes, Luiz, et al., "Characterizing a Spam Traffic," in the Proc. of the 4th ACM SIGCOMM Conference on Internet Measurement, Sicily, Italy, pp. 356-369, 2004.

Gabrilovich et al., "The Homograph Attack", Communications of the ACM, 45(2):128, Feb. 2002.

Balvanz, Jeff, et al., "Spam Software Evaluation, Training, and Support: Fighting Back to Reclaim the Email Inbox," in the Proc. of the 32nd Annual ACM SIGUCCS Conference on User Services, Baltimore, MD, pp. 385-387, 2004.

How to make sure a human is sending you mail Posted by Brandon Hume, Nov. 15, 1996 00:41:49, http://groups.google.ca/broup/news.admin.net.usenet/msg/e601783e8f40c545.

* cited by examiner

| Test Method | Test Results | | Overall Score |
|---|---|---|---|
| | Category | Probability of being spam | |
| Whitelist | New Address | 50% | 5 |
| Rules | Violate some rules | 60% | 6 |
| Thumbprints | No matching | 50% | 6 |
| Address Verification | Suspicious Address | 80% | 9 |
| Challenge | Spam | 99% | 10 |

FIG. 3

| Test Method | Possible Results | Maximum Results | Resource Consumption |
|---|---|---|---|
| Whitelist | No judgement<br>Non-spam | Non-spam | 1 |
| Blacklist | No judgement<br>Spam | Spam | 1.5 |
| Keyword rule | No judgement<br>Probably spam<br>Spam | Spam | 1.7 |
| Thumbprint | No judgement<br>Spam<br>Probably not spam | Spam | 2 |
| Statistical Classifier | No judgement<br>Probably spam<br>Probably not spam<br>Spam | Spam | 3 |
| Challenge Response | Spam<br>Non-spam | Non-spam | 4 |

FIG. 6A

MESSAGE TESTING BASED ON A DETERMINATE MESSAGE CLASSIFICATION AND MINIMIZED RESOURCE CONSUMPTION

CROSS-REFERENCE TO RELATED APPLICATIONS

This application is a continuation and claims the priority benefit of U.S. patent application Ser. No. 10/422,359 filed Apr. 23, 2003 now U.S. Pat. No. 7,539,726 issued on May 26, 2009, and entitled "Message Testing, " which is a continuation-in-part of U.S. patent application Ser. No. 10/197,393 filed Jul. 16, 2002and entitled "Active E-Main Filter with Challenge-Response."

FIELD OF THE INVENTION

The present invention relates generally to electronic messages. More specifically, a method and a system for avoiding spam messages are disclosed.

BACKGROUND OF THE INVENTION

Electronic messages have become an indispensable part of modern communication. Electronic messages such as email or instant messages are popular because they are fast, easy, and have essentially no incremental cost. Unfortunately, these advantages of electronic messages are also exploited by marketers who regularly send out unsolicited junk messages (also referred to as "spam"). Spam messages are a nuisance for users. They clog people's email box, waste system resources, often promote distasteful subjects, and sometimes sponsor outright scams.

There are many existing spam blocking systems that employ various techniques for identifying and filtering spam. For example, some systems generate a thumbprint (also referred to as signature) for each incoming message, and looks up the thumbprint in a database of thumbprints for known spam messages. If the thumbprint of the incoming message is found in the spam database, then the message is determined to be spam and is discarded.

Other techniques commonly used include whitelist, blacklist, statistical classifiers, rules, address verification, and challenge-response. The whitelist technique maintains a list of allowable sender addresses. The sender address of an incoming message is looked up in the whitelist; if a match is found, the message is automatically determined to be a legitimate non-spam message. The blacklist technique maintains a list of sender addresses that are not allowed and uses those addresses for blocking spam messages. The statistical classifier technique is capable of learning classification methods and parameters based on existing data. The rules technique performs a predefined set of rules on an incoming message, and determines whether the message is spam based on the outcome of the rules. The address verification technique determines whether the sender address is valid by sending an automatic reply to an incoming message and monitoring whether the reply bounces. A bounced reply indicates that the incoming message has an invalid sender address and is likely to be spam. The challenge-response technique sends a challenge message to an incoming message, and the message is delivered only if the sender sends a valid response to the challenge message.

Some of the existing systems apply multiple techniques sequentially to the same message in order to maximize the probability of finding spam. However, many of these techniques have significant overhead and can adversely affect system performance when applied indiscriminately. A technique may require a certain amount of system resources, for example, it may generate network traffic or require database connections. If such a technique were applied to all incoming messages, the demand on the network or database resources would be large and could slow down the overall system.

Also, indiscriminate application of these techniques may result in lower accuracy. For example, if a legitimate email message includes certain key spam words in its subject, the may be classified as spam if certain rules are applied. However, a more intelligent spam detection system would discover that the message is from a valid address using the address verification technique, thus allowing the message to be properly delivered. It would be useful to have a spam detection system that uses different spam blocking techniques more intelligently. It would be desirable for the system to utilize resources more efficiently and classify messages more accurately.

BRIEF DESCRIPTION OF THE DRAWINGS

The present invention will be readily understood by the following detailed description in conjunction with the accompanying drawings, wherein like reference numerals designate like structural elements, and in which:

FIG. 3 is a diagram illustrating how a message state data structure is used in an embodiment.

FIGS. 6A-6B illustrate a test selection process based on test results, according to one embodiment.

DETAILED DESCRIPTION

Figure 1A:
FIGS. 1A-1E are block diagrams illustrating the application of test methods to incoming messages.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

An improved technique for testing email messages is disclosed. A multipronged approach is adopted wherein test methods are applied to incoming messages to classify the messages as spam, not spam, or some other appropriate categories. In this specification, the test methods are processes or techniques that generate information useful for determining whether a message is spam. The test methods attempt to classify the message. The state of the message is updated after each test method is applied.

The classification of the message may be determinate, meaning that the message has reached a state where it will not be further tested, or indeterminate, meaning that the message will be tested further. In some embodiments, a determinate classification is made when a message is classified with reasonable accuracy as either spam or non-spam, and an indeterminate classification is made when a message cannot be accurately classified as spam or non-spam. In some embodiments, a determinate classification is also made when further information and/or resources are needed to classify the message. The measurement of whether the classification is determinant may be a probability value, a confidence level, a score, or any other appropriate metric. An indeterminate classification indicates that the message cannot be classified as either spam or non-spam, although it may still fit under other categories defined by the test method.

If the classification of the message is indeterminate, the message router then chooses an appropriate test method to be applied to the message next, and routes the message to the chosen test method. In some embodiments, to choose the next appropriate test method, the message router analyzes the state and selects the next test method based on the analysis. The testing and routing process may be repeated until the classification of the message is determinate, or until all appropriate test methods have been applied.

FIGS. 1A-1E are block diagrams illustrating the application of test methods to incoming messages. In the embodiment shown in FIG. 1A, the test methods are applied to the incoming messages. The results of the test methods have three message categories: "non-spam," "spam" and "possibly spam." Both "non-spam" and "spam" lead to a determinate classification for the message. "Possibly spam" indicate that the classification is indeterminate and that further testing is necessary.

Figure 1B:
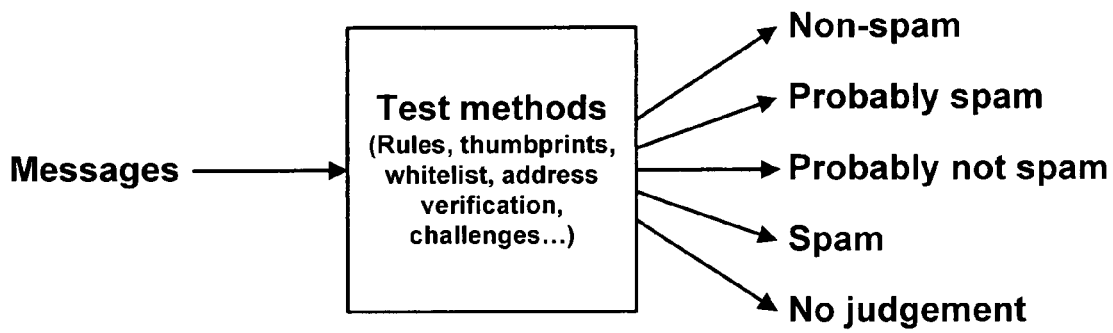

The embodiment shown in FIG. 1B employs many different test methods, including rules, thumbprints, whitelist, address verification, and challenges. The results of the test methods include five message categories: "non-spam" and "spam" that indicate determinate classification, plus "probably spam", "probably not spam" and "no judgement" that indicate indeterminate classification.

The test methods, the results of the test methods, the number of test methods and the number of results may vary for different embodiments. A variety of test methods may be used. In some embodiments, the test methods includes using distinguishing properties as disclosed in U.S. patent application Ser. No. 10/371,987 by Wilson, et al filed Feb. 20, 2003 entitled: "USING DISTINGUISHING PROPERTIES TO CLASSIFY MESSAGES" which is incorporated by reference for all purposes; and using summary information as disclosed in U.S. patent application Ser. No. 10/371,977 by Oliver, et al (filed Feb. 20, 2003) entitled: "MESSAGE CLASSIFICATION USING A SUMMARY" which is incorporated by reference for all purposes.

Figure 1C:
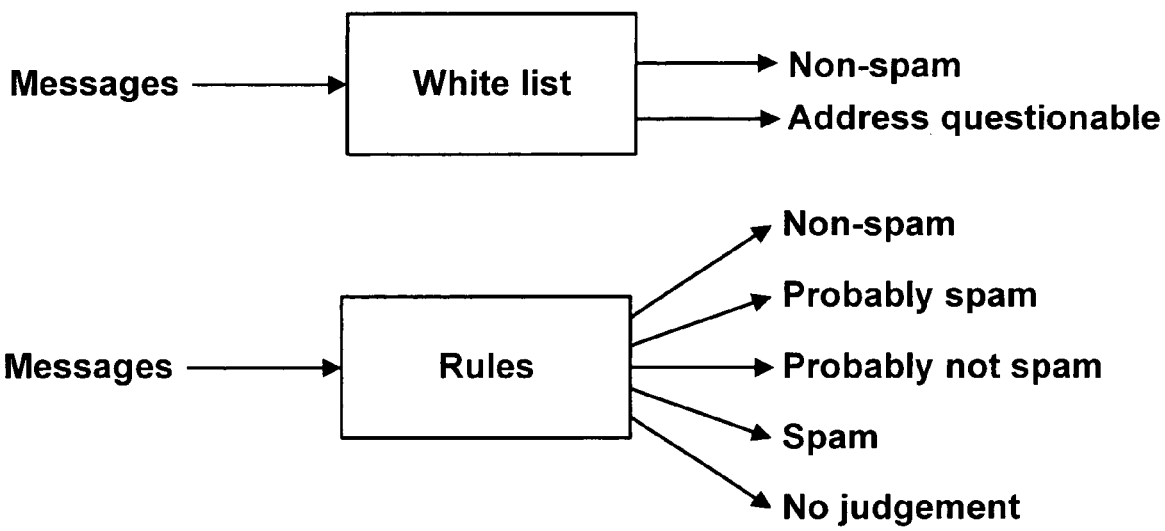

In some embodiments, different test methods may have different results. FIG. 1C illustrates an embodiment in which three test methods, whitelist, rules, and challenge are used in testing. The test methods produce different results. The whitelist test method divides the incoming messages into two different categories: "non-spam" for messages that come from allowable senders, and "address questionable" for messages whose sender addresses are not included in the allowable whitelist of senders.

The rules test method classifies the incoming messages into five different categories: "non-spam" and "spam" for messages that can be accurately classified according to the rules; "probably spam" for messages that are likely to be spam according to the rules but cannot be accurately classified; "probably not spam" for messages that are likely to be non-spam; and "no judgement" for messages that are equally likely to be spam or non-spam.

Figure 1D:
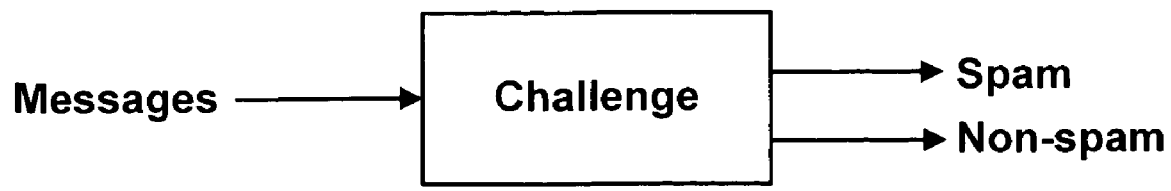

A test method may have different test results in different embodiments. In FIG. 1D, a message is processed by a challenge test. Once a challenge is issued, the message is held by the message router and is not further processed until a response is received. Upon receiving the response, the test method examines the response, and determines whether the message is spam or non-spam accordingly.

Figure 1E:
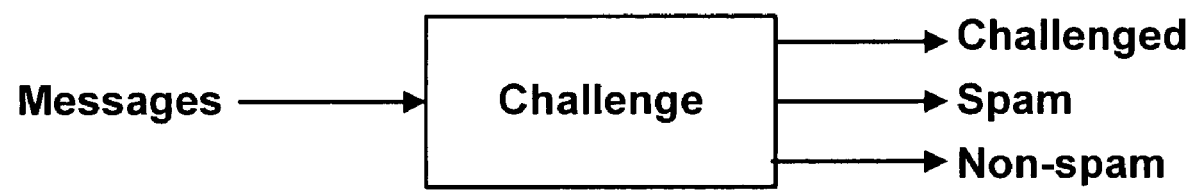

In FIG. 1E, the results of the challenge test have three categories that are all determinate: "spam", "non-spam", and "challenged". Once a challenge is issued by the test, the original message is not further tested and thus the result is "challenged". In some embodiments, the original message is deleted from the router. The test requires more information and/or resource to answer the challenge. In some embodiments, some information pertaining to the challenge is sent back in the response, and in some embodiments, some resources are required by the challenge. Details of the challenge technique are described in U.S. patent application Ser. No. 10/387,352, by Oliver, et al (filed Mar. 11, 2003) entitled: "MESSAGE CHALLENGE RESPONSE", which is herein incorporated by reference for all purposes. When a response arrives, the test examines the response, determines whether the original message is spam or not. In some embodiments, the original message is forwarded on to the intended recipient of the message. In embodiments where the original message is deleted, the response message usually includes the original message text, and is usually processed and forwarded.

In some embodiments, each message has a state associated with it. The state is stored in a state data structure, implemented in either software or hardware, used to track state information pertaining to the message and the test methods, including test results, test sequence, probability of the message being spam, etc. After a test method is applied to the message, the state is updated accordingly. In some embodiments, a message router uses the state to determine which test method should be applied to the message next.

Figure 2:
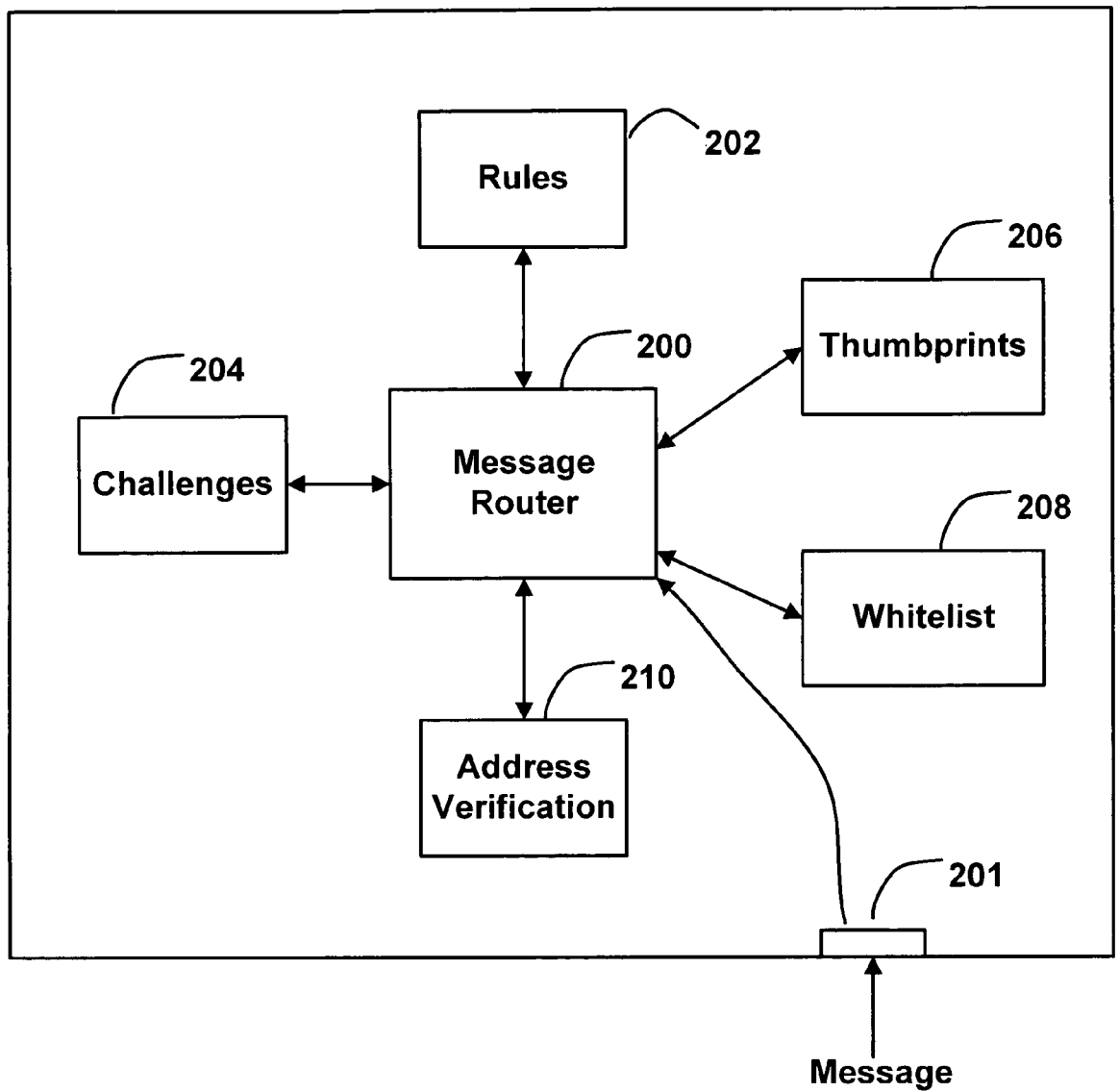
FIG. 2 is a system diagram illustrating the operations of a system embodiment.

FIG. 2 is a system diagram illustrating the operations of a system embodiment. Interface 201 receives the message and forwards it to message router 200 to be routed to various testing modules as appropriate. The interface may be implemented in software, hardware, or a combination. Various test method modules, including rules module 202, challenges module 204, thumbprints module 206, whitelist module 208, and address verification module 210, are used in testing. Message router 200 communicates with the test method modules, evaluates the current state of the message, which comprises its test results up to a given point in time, and determines an appropriate classification and further tests to be run, if appropriate.

After a message is tested by a module, its state is updated based on the test results. If the test results indicate a determinate classification, the message is delivered if it is non-spam, discarded or stored in a special junk folder if it is spam. If the test indicates an indeterminate classification, the message is passed to the message router, which analyzes the state and selects the next test method based on the analysis. In some embodiments, the message router chooses the most distinguishing test method that will most likely result in a determinate classification. In some embodiments, the message router chooses a cheapest test method that consumes the least amount of resources.

FIG. 3 is a diagram illustrating how a message state data structure is used in an embodiment. This message state data structure keeps track of the tests that have been run, the test results of each test method, and an overall score after each test on a scale of 1-10 for scoring how likely the message is spam. It should be noted that in some embodiments, the current overall score is kept and the history overall scores is not tracked. The higher the score, the more likely the message is spam. The parameters in the data structure and their organization are implementation dependent and may vary in other embodiments.

The state is available to both the test methods and the message router. After each test, if no determinate classification is made, the state is analyzed and the most distinguishing test method is chosen as the subsequent test method. The most distinguishing test method is a test method that will most likely produce a determinate classification, based on the current state of the message.

In the embodiment shown, a whitelist test is initially applied to the message. The results indicate that no determinate classification can be made, and thus a rules test is chosen next. The process is repeated until the challenge test is able to reach a determinate classification and classify the message as spam or not spam. After each test, the overall score is adjusted to incorporate the new test results and the state is updated. It should be noted that the state information is cumulative; in other words, the previous state affects the choice of the subsequent test, and thus also influences the next state. In some embodiments, some of the parameters in the current state are summations of previous states; in some embodiments, the parameters in previous states are weighed to calculate the parameters in the current state.

Different messages are likely to produce different test results and different states, thus, the message router may choose different test sequences for different messages. While the test sequence shown in FIG. 3 is whitelist-rules-thumbprints address verification-challenge, another message may have a different test sequence. For example, after whitelist and rules test, the state of the other message may indicate that a challenge test is the most distinguishing test that will most likely determine whether the message is spam. Thus, the other message has a test sequence of whitelist—rules—challenge. A determinate classification can be reached without having to apply all the tests to the message, therefore increasing the efficiency and accuracy of the system.

Figure 4:
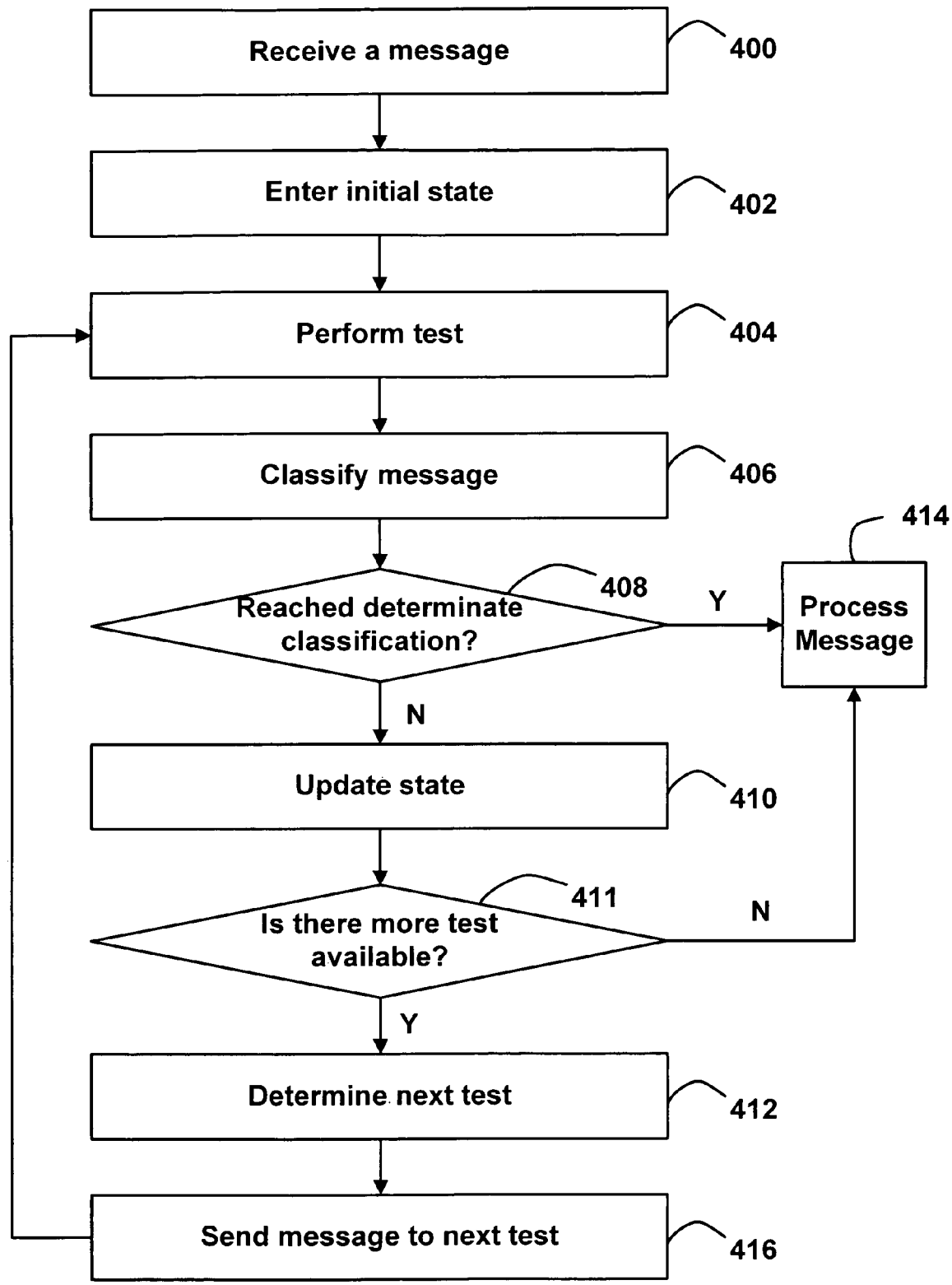
FIG. 4 is a flowchart illustrating the processing of a message according to one embodiment.

FIG. 4 is a flowchart illustrating the processing of a message. Once a message is received (400), the processing enters an initial state (402). A test is then performed on the message (404), and the message is classified based on the test results (406). It is then decided whether the test results indicate a determinate classification (408). If a determinate classification is reached, the message is determinatively classified as either spam or non-spam to be processed accordingly (414). If, however, the classification is indeterminate, then the state is updated (410). It is then determined whether there are available tests that have not been used (411). If all the tests have been performed and there are no more tests available, then the message is processed based on test results obtained so far (414). Generally, the message is treated as non-spam and delivered to the intended recipient. If there are more tests available, the next test is chosen (412). The message is then routed to the next test (416), and control is transferred to the performing test step (404) and the process repeats.

The criteria for choosing the subsequent test are implementation dependent. In some embodiments, the message router chooses the most distinguishing test to maximize its chance of reaching a determinate classification; in some embodiments, the message router chooses the cheapest test to minimize resource consumption. Both the cost of each available test and the likelihood of the test discriminating between spam and nonspam may be considered to select the most efficient test. In some embodiments, the next test is selected based on a lookup table that returns the next test based on the tests already taken and the overall score achieved so far. A more complex lookup table may also be used that selects the next test based on the results of specific tests. The decision may also be made adaptively, based on tests that have been determinative in the past for the user. In some embodiments, the results of the tests are input into a statistical classifier, such as a neural network, that is trained based on past data to learn the optimal test selections. User preferences may also be used to select a test that is particularly effective for detecting certain types of spam that are particularly undesirable for the user, or the user may select preferred tests.

Figure 5:
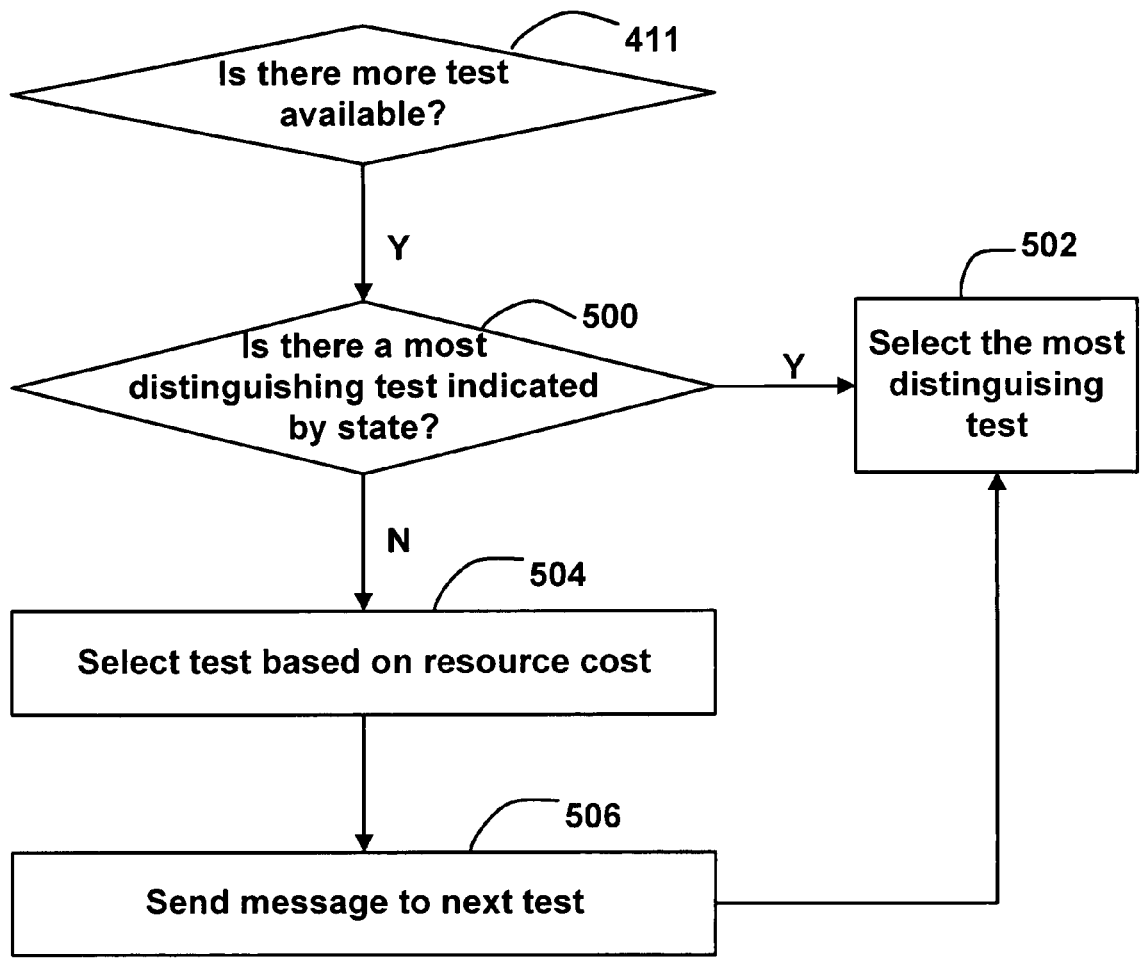
FIG. 5 is a flowchart illustrating a test selection process according to one embodiment.

FIG. 5 is a flowchart illustrating a test selection process according to one embodiment. It shows details of step 412 in FIG. 4. Once it is decided that more tests are available (411), it is determined whether the state indicates a most distinguishing test among the remaining tests (500). If a most distinguishing test exists, then the test is selected (502) and the message is sent to the selected test by the router (506). If, however, a most distinguishing test does not exist, then the subsequent test is selected based on resource cost (504). Generally, the cheapest test that incurs the least amount of resource cost is selected.

Figure 6B:
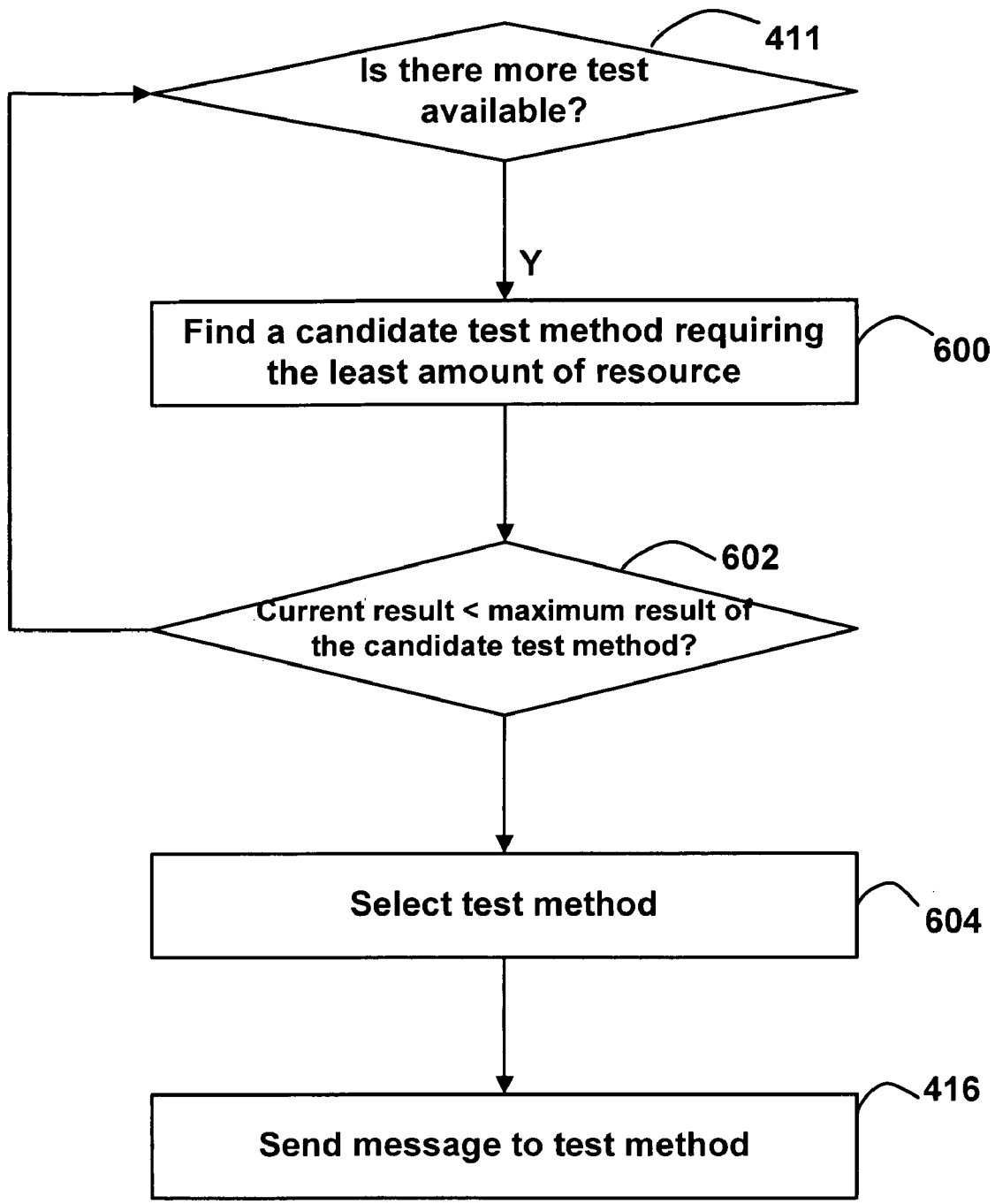

FIGS. 6A-6B illustrate a test selection process based on test results, according to one embodiment. FIG. 6A is a table showing a plurality of test methods and their associated parameters. The test methods are sorted according to their resource consumption, where 1 indicates the least amount of resource consumed and 4 indicates the most. The possible results for the test methods are also shown, and are enumerated as the follows: no judgement=1; probably spam=2; probably not spam=3; spam=4; non-spam=5. The maximum result available to each of the test methods is also shown. It should be noted that the values in the table may be different for other embodiments.

FIG. 6B is a flowchart illustrating a test selection process that utilizes the table shown in FIG. 6A. Once it is decided that more tests are available (411), a candidate test method that consumes the least amount of resource is located according to the table (600). The current result stored in the state of the message is compared with the maximum result of the candidate test method. It is determined whether the current result is less than the maximum result of the candidate test method. In some embodiments, the current result is the result obtained from a previous test. If the current result is less than the maximum result of the candidate test method, the candidate test method is selected (604) and applied to the message (416). If, however, the current result is not less than the maximum result of the candidate test method, the candidate test method is not selected and control is returned to step 411 to repeat the process.

An improved technique for testing email messages has been disclosed. A multipronged approach is adopted wherein a plurality of test methods are made available to help classify a message as spam or not spam. The system keeps track of a state associated with a message and its test results from various test methods. A message router uses the state to route the message among the test methods, until a determinate classification is reached. Since the test sequence is selected intelligently, it is more efficient, more accurate, and consumes fewer resources.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for testing a message, comprising:
    receiving a message at an interface connected to a communications network; and
    executing a program stored in a computer readable storage medium to:
        select a first test method to apply to the message once the message is received, the selection of the first test method based on the first test method corresponding to the least amount of resource consumption,
        receive a result from an application of the selected first test method,
        update a state of the message based on the result of the selected first test method, and
        process the message in accordance with a classification of the message, wherein the classification reflects whether the state of the message is determinate or indeterminate.

2. The method of claim 1, wherein processing the message includes selecting a second test method to apply to the message when the state of the message is indeterminate.

3. The method of claim 2, wherein the second test method is selected based on a user preference.

4. The method of claim 2, wherein the second test method is selected based on the output of a statistical classifier.

5. The method of claim 2, wherein the second test method is selected based on the selected first test method.

6. The method of claim 2, wherein the second test method is selected based on the result of the selected first test method.

7. The method of claim 2, wherein the second test method is selected based on the next lowest amount of resource consumption as compared to the first test method.

8. The method of claim 1, wherein the state of the message is selected from the group consisting of a score, a confidence level, a probability value, and a combination of any of the foregoing.

9. The method of claim 8, wherein the score comprises a cumulative parameter based on a result of a first test method applied to the message.

10. The method of claim 1, wherein processing the message includes selecting a subsequent test method to apply to the message when the state of the message is indeterminate, and subsequent test methods are continuously applied to the message until the state of the message is determinate or until all available test methods have been applied to the message.

11. The method of claim 10, wherein the subsequent test methods are selected based on the new lowest amount of resource consumption as compared to the immediately prior test method applied to the message.

12. A message testing apparatus, comprising:
    memory storing a state data structure, the state data structure including:
        a list of available test methods to apply to a received message,
        a test result from each test method, and
        a parameter based on the test result;
    a network interface configured to receive a message from over a communications network; and
    a processor configured to execute software stored in the memory to:
        select a test method to apply to the received message, the selection of the first test method based on the first test method corresponding to the least amount of resource consumption,
        send the received message to a test module for execution of the test method,
        update the state data structure based on a result of the selected test method, and
        process the message in accordance with a classification of the message, wherein the classification reflects whether the state data structure indicates that the message is determinate or indeterminate.

13. A non-transitory computer-readable storage medium having embodied thereon a program, the program being executable by a computer to perform a method for testing a message, comprising:
    receiving a message;
    selecting a first test method to apply to the message once the message is received, the selection of the first test method based on the first test method corresponding to the least amount of resource consumption;
    receiving a result from an application of the selected first test method;
    updating a state of the message based on the result of the selected first test method; and
    processing the message in accordance with a classification of the message, wherein the classification reflects whether the state data structure indicates that the message is determinate or indeterminate.

* * * * *